United States Patent [19]

Griggs

[11] 4,024,646
[45] May 24, 1977

[54] VANE GAUGING AND ALIGNING MACHINE

[76] Inventor: Elmer L. Griggs, 1720 Toledo, Burlingame, Calif. 94010

[22] Filed: Nov. 17, 1975

[21] Appl. No.: 632,272

[52] U.S. Cl. .......................... 33/174 P; 33/174 L; 33/143 L
[51] Int. Cl.² .......................................... G01B 7/28
[58] Field of Search .......... 33/174 L, 174 C, 174 P, 33/174 PA, 143 L, 143 M, 147 N, 148 H, 1 N, 181 R, 180 R; 72/10; 29/23.5, 156.8

[56] References Cited

UNITED STATES PATENTS

| | | | |
|---|---|---|---|
| 3,318,009 | 5/1967 | Tishler et al. | 33/174 P |
| 3,832,784 | 9/1974 | Samuels et al. | 33/174 C |

Primary Examiner—Richard E. Aegerter
Assistant Examiner—Willis Little
Attorney, Agent, or Firm—Robert Charles Hill

[57] ABSTRACT

Apparatus for simultaneously gauging and aligning movable elements to a preselected standard is particularly applicable to structures such as guide vane assemblies wherein a plurality of vanes or airfoil elements are supported in radially spaced apart relation by suitable flange means, the apparatus including jaws movable by motor means for aligning both the trailing and leading edges of individual vanes, a monitoring means being incorporated within the jaws to sense initial alignment of the vane and signal the motor means through a suitable amplifier in order to realign the individual vane by means of the motor means and movable jaws. For the preferred application of gauging and bending airfoil elements, the apparatus also includes means for indexing each vane of an annular vane assembly in alignment with the jaw structure as well as additional control elements for facilitating the rapid and accurate gauging and alignment of the vane assembly.

18 Claims, 6 Drawing Figures

U.S. Patent  May 24, 1977  Sheet 3 of 3  4,024,646

VANE GAUGING AND ALIGNING MACHINE

BACKGROUND OF THE INVENTION

The present invention relates to gauging and bending or aligning apparatus. The gauging and bending apparatus is particularly contemplated for use in aligning radially arranged airfoil elements such as guide vanes or turbine blades in turbojet engines. In this connection, reference is made to prior U.S. Pat. No. 3,464,119, issued Sept. 2, 1969 to the inventor of the present gauging and bending apparatus. That patent relates to a classification gauge suitable for determining the relative effective open area in various stages of the turbojet engines.

Substantial background information is set forth by the above noted patent and is not included herein since it is not believed essential to an understanding of the present invention. Generally, it is believed sufficient to understand that a precisely determined, effective open area between adjacent guide vanes, commonly referred to as "throat area," is necessary to permit proper passage of gases through various stages of such engines. The throat area of a turbojet engine must be closely regulated in order to allow the engine to perform properly. If the throat area is below a minimum amount, "choke-off" may occur and the desired quantity of fluid or gas may not be able to pass through that engine stage.

The classification gauge referred to above is suitable for determining the proper classification of individual guide vanes used in various stages of such engines. The classification gauge functions generally to accurately position a trailing edge of the airfoil within a precision jig and then to arrange a spaced-apart portion of the airfoil in a position determined by other parameters including the effective total length for the guide vane. The guide vane may thus be accurately positioned in an angular arrangement with an indicating gauge then being effective to measure the relative angular position of a mounting flange for the guide vane in order to closely determine the existing open throat area for one or more guide vanes or airfoil elements. However, such a classification gauge could not be used to vary the effective throat area for an existing array of airfoil elments or vanes.

Accordingly, there remains a need for apparatus to gauge or determine the effective classification for vane clusters or individual airfoil elements as well as to adjust the angular alignment of the vanes or elements at a preselected value as part of the same operation. Apparatus for accomplishing these combined functions of gauging and bending could be adapted for use in a variety of other applications as well.

SUMMARY OF THE INVENTION

It is an object of the present invention to provide a gauging and aligning method and apparatus for determining the initial angular alignment of vanes or other elements and to adjust or bend the elements to a preselected alignment.

It is a more particular object of the invention to provide such a gauging and bending apparatus particularly suited for establishing preselected angular alignment of radially arranged vanes to thereby achieve a predetermined or uniform throat area between the radially spaced-apart vanes.

It is an even more particular object of the invention to gauge and align both the leading and trailing edges of a series of vanes in a simultaneous or continuous operation.

In this connection, reference is made above to a gauge for determining the "classification" of existing vanes or vane clusters. The term classification as employed herein refers to an arbitrary standard used, for example, by airplane engine manufactures for constructing or selecting the proper throat area in a particular stage of a turbojet engine. Each classification number represents a specific throat area. The classification for a guide vane is determined by its angular alignment, its spacing from an adjacent vane and the effective length of the vane.

The present invention takes into consideration the fact that such airfoil elements or vanes tend to have generally uniform spacing and lengths. Accordingly, the classification of the vanes is determined primarily by their angular arrangement. With this consideration in mind, the present invention is particularly adapted to determine the angular alignment of the vane or other element and to adjust or bend the vane or airfoil element into a preselected angular alignment in order to order to achieve a predetermined or uniform throat area.

In meeting the above noted objects and performing the functions described immediately above, it is necessary to provide a signal representative of the instant angular alignment for the vanes or other elements and then to provide a magnified signal suitable for actuating motor means to adjust or bend the vanes or elements into the preselected alignment. For this purpose, the present invention also contemplates the use of a monitor unit designed to precisely produce a fluid or pneumatic signal of relatively low magnitude pressure but closely proportioned to initial alignment of the vane or other element. An amplifier includes a multiplying valve for generating a magnified signal proportional to that low pressure air signal as well as pilot means responsive to the magnified signal for actuating motor means to adjust or bend the vane or other element into the preselected angular alignment. This amplifier was the subject of a prior application entitled FLUID SIGNAL AMPLIFIER, filed on Aug. 1, 1975, Ser. No. 601,096 by the instant inventor, now abandoned.

Additional objects and advantages of the invention are made apparent in the following description having reference to the accompanying drawings.

DESCRIPTION OF THE PREFERRED EMBODIMENT

Figure 1:
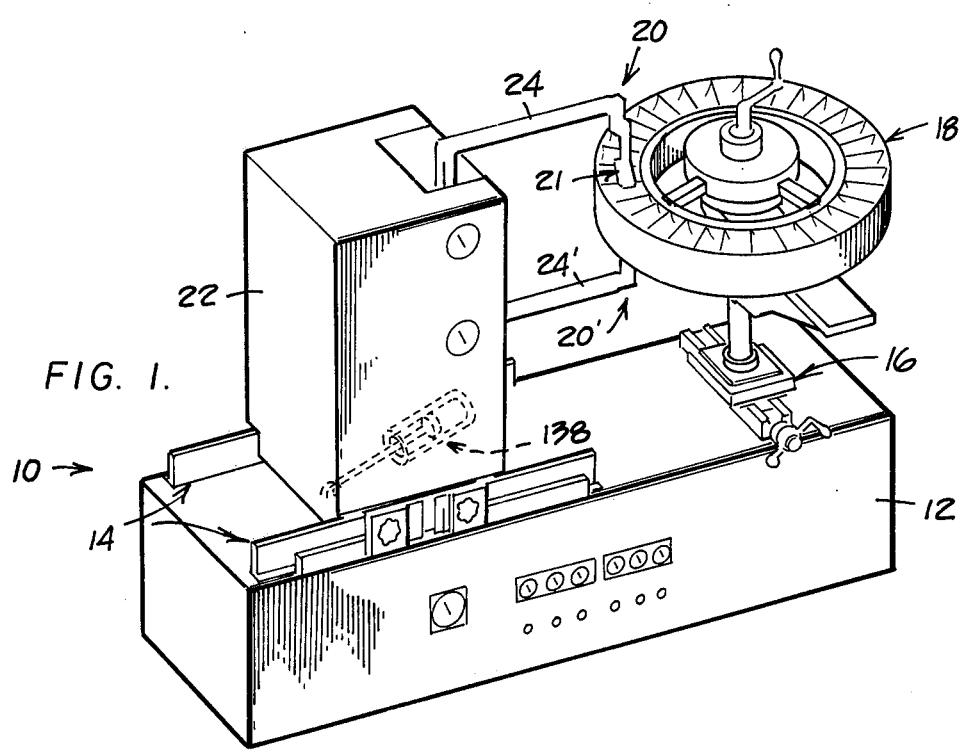
FIG. 1 is a perspective view of a gauging and bending apparatus constructed according to the present invention and particularly adapted for aligning radially arranged vanes such as those found in a vane cluster useful, for example, in one stage of a turbojet engine.

The present invention is preferably embodied within a gauging and bending apparatus of the type illustrated in FIG. 1. Referring now to FIG. 1, the gauging and bending machine generally indicated at 10 includes a frame 12 with tracks or rails 14 and a support stand 16. An assembly 18 including vanes or elements to be gauged and realigned is firmly secured upon the stand 16. The vane assembly 18 is preferably a circumferential arrangement of radially spaced-apart guide vanes secured together by respective mounting flanges in a manner suitable for assembly into one stage of a turbojet engine. It will be apparent from the following description that a gauging and aligning apparatus such as the machine indicated at 10 may be employed with a wide variety of structures or assemblies including elements to be adjusted into a predetermined angular alignment.

The vane assembly 18 is preferably mounted for rotation upon the stand 16 in order to bring each ot its vanes into register with a pair of head units generally indicated at 20 and 20'. The guide vane assembly 18 is in engagement with the support stand 16 by means of its mounting flanges. The mounting flanges also are employed to secure the vane assembly within one stage of a turbojet engine. Accordingly, with the mounting flanges maintained in a fixed position upon the support stand 16, the vanes may be properly aligned to assure a precise classification number when the guide vane assembly is mounted within the engine.

The head units 20 and 20' include jaws for respectively gripping the leading edge and trailing edge of each vane and monitor means for sensing the initial angular alignment of the vane. The head units are described in greater detail below, particularly with reference to FIGS. 2–4. The head units are arranged upon a carriage 22 which is movably mounted upon the frame 12 by means of the slide rails 14.

A control arm 24 extending outwardly from the carriage 22 supports a jaw assembly generally indicated 21 of the head unit 20 and is adapted to shift the jaw assembly in a manner described in greater detail below for bending or aligning a trailing edge 28 of the individual vanes 26 within the vane assembly 18. Similarly, a control arm 24' supports a jaw assembly 21' of the head unit 20' for gauging and bending a leading edge 30 of the vanes.

Detailed constructional features of the gauging and bending apparatus 10 are set forth in greater detail below. However, the construction and operation of the gauging and bending machine may be better understood following a brief description of the vane assembly 18.

The angular alignment of the vanes and accordingly their respective throat areas may tend to change or vary during use because of distortion caused, for example, by heat, the force of gases passing through the vane assembly and erosion due to use. The present gauging and bending apparatus may also be employed to readjust the individual vanes to a predetermined angular alignment in order to assure a proper throat area within the vane assembly.

The head units 20 and 20' are of substantially identical construction and operation except that they engage the trailing edge and leading edge of each vane. For that reason, their jaws are of different configuration. Otherwise, the components of the unit 20' are similar to the elements described below for the unit 20 and similar primed numerals are employed for their identification.

Figure 2:
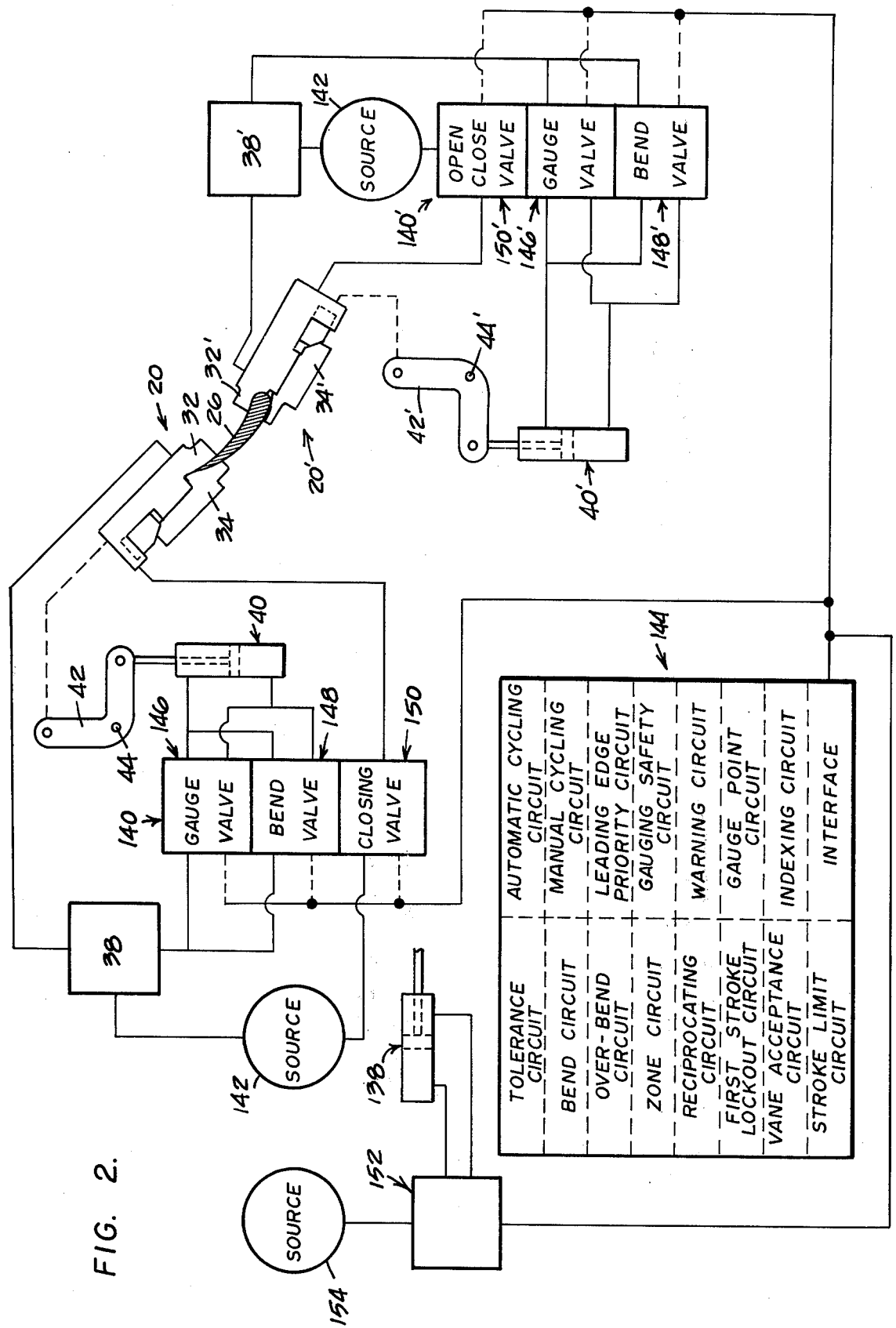
FIG. 2 is a generally schematic representation of those components within the gauging and bending apparatus which sense instant alignment of each vane or element and adjust or bend the vane or element into a preselected alignment.

The major components of the gauging and bending machine 10 and its mode of operation are best illustrated by FIG. 2 and certain subsequent figures. Those components are summarized immediately below before proceeding with a more detailed description as to structural details and operating functions.

Figure 3:
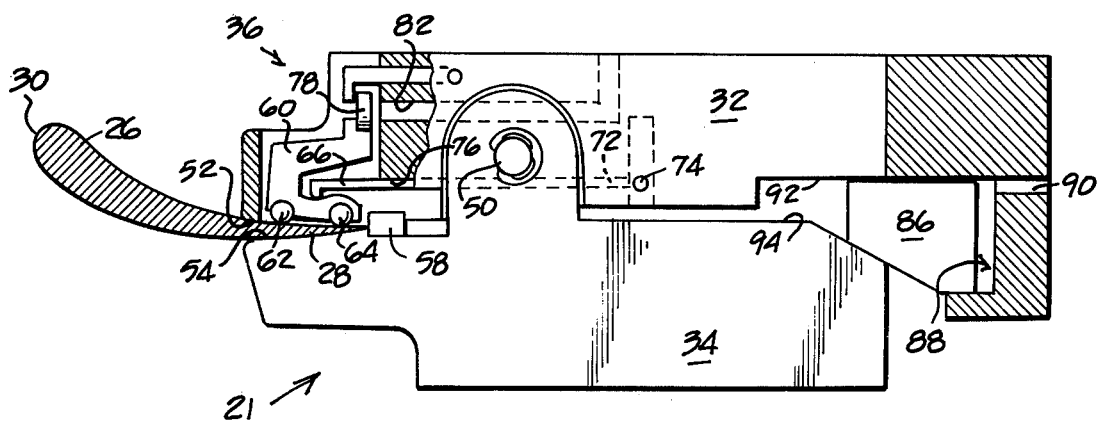
FIG. 3 is an enlarged, fragmentary view of jaw means particularly contemplated for use within the gauging and bending apparatus which also include monitoring means for sensing instant alignment of the vane or other element.

Referring particularly to FIG. 2, the head unit 20 supported by the control arm 24 includes a pair of jaw members 32 and 34 which are suitably formed for gripping a selected airfoil element or vane such as that indicated at 26. Referring momentarily to FIG. 3, the head unit 20 also includes monitoring means generally indicated at 36. The monitoring means 36 is formed within the jaw member 32 in order to sense instant alignment of the vane 26 while it is being compared to a known standard.

The monitoring means 36 is coupled with a fluid signal amplifier unit 38 (FIG. 2) which responds to a signal from the monitoring means for actuating motor means such as the double-acting hydraulic jack indicated at 40. The hydraulic jack 40 is coupled in turn with the arm 24 through lever means such as the bellcrank indicated at 42 and having a fixed pivot point at 44.

Through this arrangement, which is schematically illustrated in FIG. 2, the selected vane 26 is gripped by the jaws 32 and 34, its angular alignment being sensed by the monitoring means 36. The monitoring means generates a signal representative of the angular alignment for the selected vane 26 which is communicated to the signal amplifier unit 38. The amplifier unit 38 includes multiplying means or an amplifier such as that indicated generally at 46 in FIG. 5. The amplifier 46 produces a magnified output signal in proportion to the signal received from the monitoring means. Accordingly, the magnified output signal from the amplifier 46 is also proportional to initial alignment of the vane 26.

Figure 5:
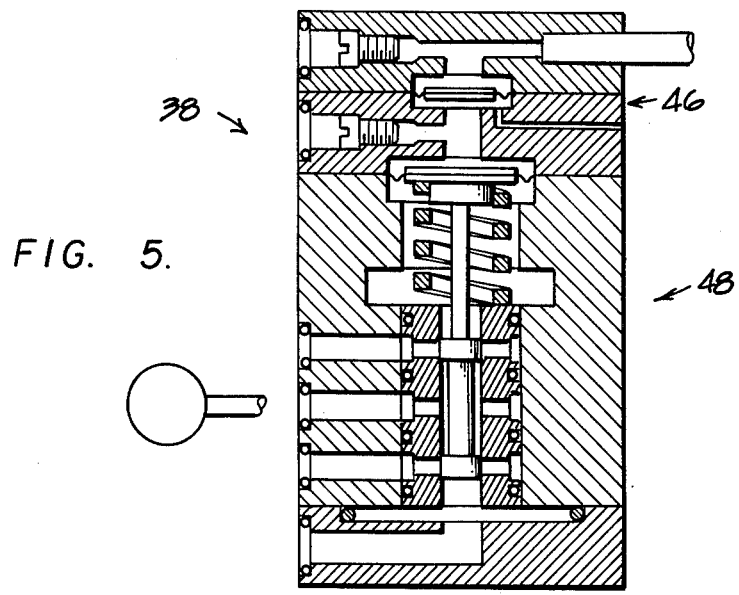
FIG. 5 is a view, with parts in section, of a fluid signal amplifier for producing a magnified signal within the gauging and bending apparatus.

The fluid signal amplifier unit 38 also preferably includes a pilot means such as the valve indicated generally at 48 in FIG. 5. The pilot valve 48 functions in response to the magnified output signal from the multiplying valve or amplifier 46 for conventionally actuating the double-acting hydraulic jack 40.

The amplifier unit 38 as illustrated in FIG. 2 and including elements such as those discussed above with reference to FIG. 5 is included within the control unit indicated at 22 in FIG. 1. Otherwise, the amplifier unit 38 of FIG. 5 is not discussed in greater detail since its construction and method of operation are clearly set forth in the above noted reference.

The entire carriage 22 is movable upon the rails 14 in order to adapt it for register with vane assemblies or other element structures in place of that indicated at 18. The carriage 22 also has control means which perform other functions such as automatically programming the steps described immediately above. In addition to such programmed operation, the carriage 22 may additionally serve, for example, to rotate the vane assembly 18 in order to sequentially place each of its vanes, such as that indicated at 26, in appropriate register with the head unit 20.

Figure 4:
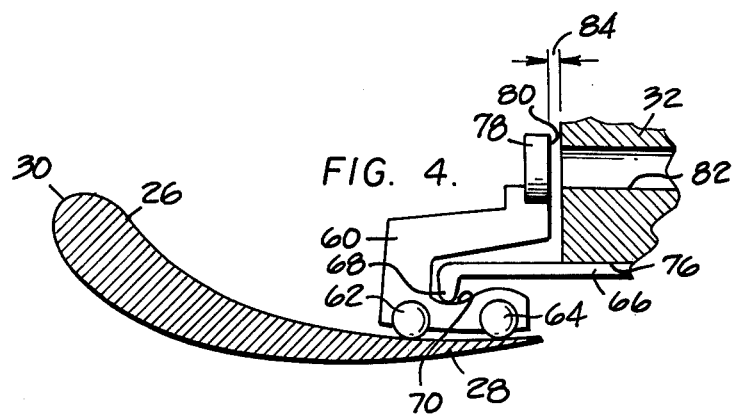
FIG. 4 is an even further enlarged fragmentary view illustrating a specific movable sensing element for determining alignment of an airfoil element or vane.

As to components within the gauging and bending machine 10, reference is first made to FIGS. 3 and 4 in conjunction with FIG. 2 described above. The two jaw members 32 and 34 within the head unit 20 are secured together by means of a pin indicated at 50. The respective jaw members 32 and 34 include surfaces 52 and 54 which are precisely shaped for intimate engagement with surfaces adjacent the trailing edge 28 of the guide vane 26.

Means arranged within the jaw member 34 may be adjusted to engage the other jaw member 32 in order to urge their jaw surfaces 52 and 54 toward each other. The relative positions of the jaw surfaces 52 and 54 may then be established by a stop block 58 mounted upon the one jaw member 32 adjacent its jaw surface 52 for engagement with the other jaw member 34.

The monitoring means 36 is preferably of a type for producing a relatively low pressure pneumatic signal which is closely proportional to initial alignment of the guide vane 26. The monitoring means 36 has a movable rocker element 60 including a plurality of spherical contacts such as those indicated at 62 and 64. The rocker element 60 is mounted within the jaw member 32 with the spherical contacts projecting outwardly past the jaw surface 52 for engagement with a surface portion of the guide vane 26 adjacent its trailing edge 28.

The rocker element 60 is resiliently urged downwardly for intimate engagement ot its spherical contact 62 and 64 with the guide vane 26 by means of a spring lever 66 having a downwardly projecting end 68 which forms a pivot fulcrum for the rocker element 60. These features may be best seen in FIG. 4. The rocker element 60 is formed with a bearing surface indicated at 70 to receive the fulcrum point 68 of the lever. In this manner, the rocker element 60 is free to rotate about the fulcrum point 68 in accordance with initial angular alignment of the guide vane 26. Referring particularly to FIG. 3, the opposite end 72 of the spring lever 66 is secured within the jaw member 32 by means of a pin 74. An intermediate portion of the lever 66 bears against a projecting surface 76 formed by the one jaw member 32, that portion of the lever which extends leftwardly from the projecting surface 76 providing the spring function for urging the rocker element 60 downwardly.

The upper end of the rocker element 60 is formed with a gauging block 78 having a precision ground surface 80 which is arranged in closely spaced apart relation to a conduit 82. The conduit 82 is connected with the amplifier 46 as will be described in greater detail below. However, it may be seen that as the rocker element 60 rotates about the pivot point 68, the gauging block 78 moves toward or away from the conduit 82 to form a variable air gap generally indicated at 84. In this manner, the monitoring means 36 functions to produce a relatively low pressure pneumatic signal closely proportional to intial alignment of the guide vane 26.

The multiplying valve illustrated in FIG. 5 functions in combination with the monitoring means described above to produce a magnified signal closely proportional to initial angular alignment of the guide vane 26.

Clamping force for each of the jaw assemblies 21 is provided by means of a piston element 86, which is slidably arranged within a chamber 88 adjacent the jaw 32. A passage 90 is also formed for communicating hydraulic fluid into the chamber 88. The piston 86, which is a part of control arm 24 and not replaceable as are the jaw members 32 and 34, is wedge-shaped and extends into a wedge-shaped opening formed by surfaces 92 and 94 upon the jaws 32 and 34. Accordingly, hydraulic fluid pressure within the chamber 88 tends to shift the piston 86 leftwardly which in turn tends to cause the jaws 32 and 34 to close into engagement with the air foil member 26. Spring means within the jaw assembly tend to maintain the jaws 32 and 34 in an open condition.

Figure 6:
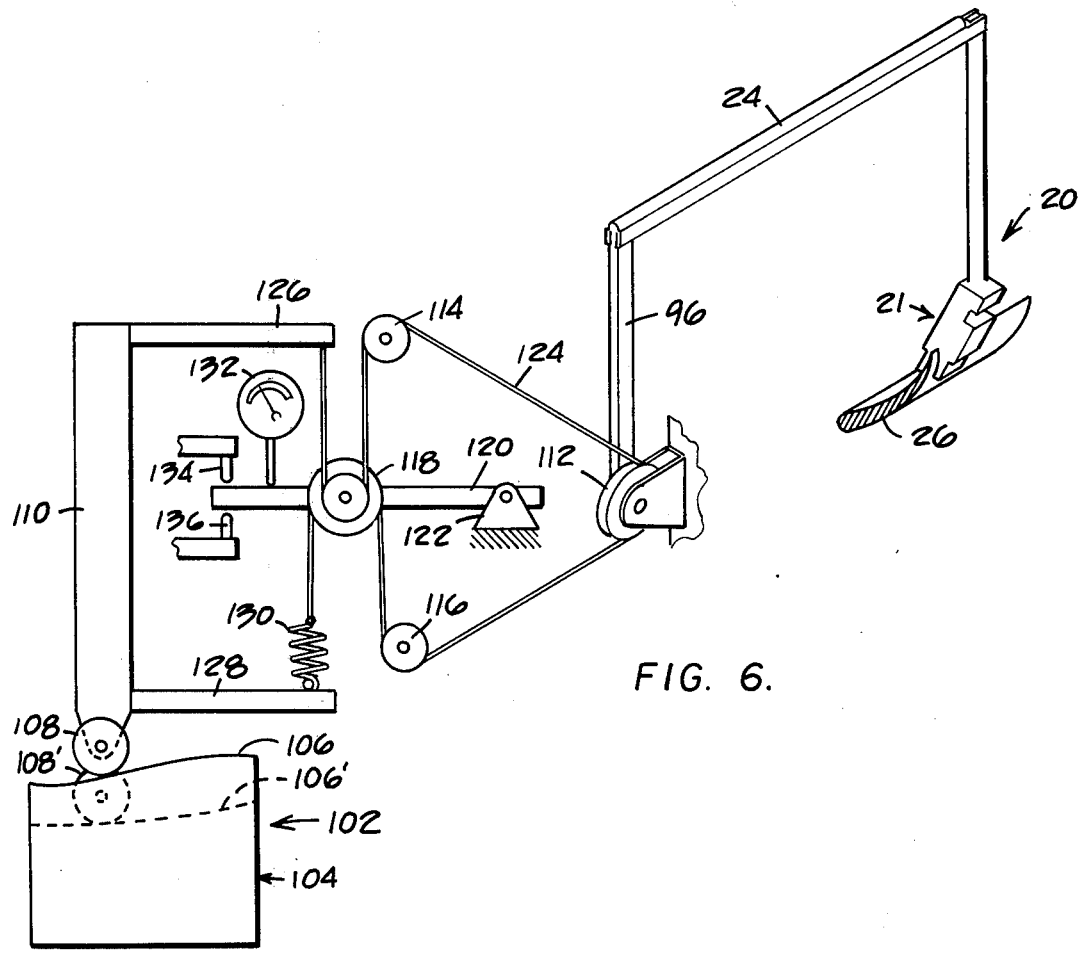
FIG. 6 is a schematic representation of a balance mechanism for comparing the actual angular alignment of an airfoil vane with a predetermined standard.

As indicated above, the fluid signal amplifier unit 38 together with monitoring means 36 for each jaw assembly serve to monitor the position of one edge for the airfoil element 26 and to generate a signal corresponding to the instant position of the vane. In addition, it is also necessary to monitor the instant position of each edge of the vane in accordance with a predetermined standard. This function is carried out by the combination of elements schematically illustrated in FIG. 6. Referring to FIG. 6, the head unit 20 and the control arm 24 are interconnected with a lever arm 96 in such a manner that when the jaws for the head unit 20 are engaged with the airfoil element 26, the lever 96 is caused to assume an angular position closely corresponding to the actual position of the airfoil edge. Having reference also to the entire gauging and bending machine as illustrated in FIG. 1, it will be seen that the above noted components are actually in different alignment from the illustration of FIG. 6. The schematic representation of FIG. 6 is intended only to illustrate the correlation between the angular position for the trailing edge of the airfoil element 26 and the lever arm 96.

The predetermined standard against which the angular alignment of the airfoil edge is determined is provided by means of a cam assembly indicated at 102. The correlation between the predetermined standard established by the cam assembly 102 and the instant angular position of the airfoil edge as represented by angular alignment of the lever arm 96 is accomplished through an accurate balance mechanism which is described below.

The cam assembly 102 includes a plate 104 mounted upon the frame 12 (see FIG. 1) and forming a cam track 106. The cam track unit 104 is replaceable upon the frame 12 since the track 106 must be shaped to conform to the particular airfoil element 26 which is being gauged by the machine.

A cam roller 108 is mounted upon the carriage or control unit 22 while being vertically movable to remain in close engagement with the cam track 106. A balance framework 110 is arranged for movement with the cam roller 108.

The lever arm 96 is secured to a pulley 112 so that the pulley is rotated together with the lever arm 96. Additional pulleys are mounted in fixed relation upon the carriage unit 22 while an additional balance pulley 118 is mounted along the midlength of a balance arm 120, one end of the balance arm being secured at 122 to a fixed pivot point upon the carriage 22. A continuous non-elastic cable 124 is trained about the pulley 112 then about the two pulleys 114 and 116. The opposite ends of the cable 124 are then trained around separate grooves in the pulley 118 while being secured to opposing arms 126 and 128 of the balance framework 110. One end of the cable 124 is secured to the arm 128 by spring means 130 in order to provide closely controlled tension.

Through the pulley and cable arrangement described above, the balance arm 120 tends to remain in fixed, generally horizontal position as long as the instant position of the airfoil edge correlates with the predetermined value established by the cam assembly 102. However, if the airfoil edge is out of alignment in either direction from that predetermined value, the balance arm 120 tends to rotate either clockwise or counterclockwise. Any movement of the balance arm 120 is sensed by an indicator 132 as well as limit switches such as those indicated at 134 and 136, for example. Here again, the indicator 132 and the limit switches 134 and 136 are mounted upon the carriage or control unit 22 in order to accurately sense any angular movement of the balance arm 120.

A similar balance and cam assembly is provided for the other head unit 20'. A cam assembly for determining a preselected value in conjunction with the other head 20' is represented by the cam track and cam roller indicated respectively at 106' and 108'. Accordingly, angular alignment of the leading edge of the airfoil element 26 is similarly compared with a predetermined value by a similar combination of components.

The alignment indicator 132 and the switches 134 and 136 operate in conjunction with an electrical control section described below. Before describing the electrical section and its mode of operation, it is also noted that the control unit or carriage 22 is adapted for transversing movement in order to move the head unit 20 and 20' along the entire length of the trailing edge and leading edge of each airfoil element 26. For this reason, a reciprocating hydraulic jack 138 (FIG. 1) is interconnected between the carriage or control unit 22 and the frame 12. Accordingly, extension or retraction of the jack 138 serves to move the carriage or control unit 22 along the tracks 14.

Referring to FIG. 2, the hydraulic jacks indicated at 40 and 40' serve both a gauging and bending function in connection with the respective head units 20 and 20'. Operation of each of the jacks, for example that indicated at 40, is controlled by a hydraulic valve set 140 which also functions to communicate fluid into the chamber 88 (see FIG. 3) for closing and opening the jaws 32 and 34. In order to accomplish the various functions necessary within the present invention, the valve set 140 is in communication with the fluid signal amplifier unit 38, a pump or source of fluid under pressure 142 and a common electrical control section generally indicated at 144. The valve set 140 includes a gauging valve 146 and a bending valve 148 which are separately operable by the electrical section 144 for communicating regulated fluid pressure from the amplifier unit 38 to either the head or rod end of the cylinder 40. The valve set 140 also includes an additional valve 150 which is also controlled by the electrical control section 144 for selectively opening and closing the jaws 32, 34 within the head unit 20. The closing valve 150 receives fluid under pressure directly from the pump 142 and includes a pressure reducer (not otherwise shown) in order to selectively provide a suitable pressure within the chamber 88 of the head unit 20.

A similar valve set 140' and other similar related components is also associated with the other jack 40' for similarly adjusting the angular alignment of the head unit 20' and for opening and closing its jaws 32' and 34' under the influence of the same electrical section 144.

The electrical control section 144 is also in communication with an additional reciprocating valve 152 which serves to selectively communicate an additional pump or source of fluid under pressure 154 with the reciprocating valve 138 described above in connection with FIG. 1.

The electrical control section 144 is a generally conventional timing circuit, the specific components of which are not of critical importance to the present invention. In order to simplify the present description and emphasize those features which are believed to most importantly contribute to the present invention, the electrical control section 144 may be seen as including a number of circuits for performing respective tasks in conjunction with the gauging and bending machine 10. Those ciruits, which are identified by their respective functions, are listed immediately below:

Tolerance Circuit
Bend Circuit
Over-bend Circuit
Zone Circuit
Reciprocating Circuit
First-stroke Lockout Circuit
Vane Acceptance Circuit
Stroke Limit Circuit
Automatic Circuit
Manual Cycling Circuit
Leading Edge Priority Circuit
Gauging Safety Circuit
Warning Circuit
Gauge-point Circuit
Indexing Circuit
Interface Circuit The last noted interface circuit of course, merely provides means for interconnecting the other circuits with the various electrically operated components within the valve sets 140 and 140' as well as the reciprocating valve 152. In order to facilitate operation by the electrical section, all of the above noted valves may be considered as being generally conventional solenoid type valves.

The mode of operation for the present gauging and bending machine is summarized immediately below followed by a more detailed description of the operations which are sequentially performed by the gauging and bending machine.

The head units 20 and 20' ae designed to track along the entire length of the trailing and leading edges for each airfoil element. The head units 20 and 20' in combination with the cylinders 40 and 40' as well as other components within the gauging and bending machine serve to first gauge alignment of the vane edges and then to bend or adjust the angle of the edges in accordance with a preselected standard.

Each of the head units 20 and 20' performs in substantially the same manner. For example, the head unit 20 functions primarily in connection with its amplifier unit 38 to perform the gauging operation with the cylinder 40 being responsive to the amplifier unit 38 for properly aligning the jaws 32 and 34 of the head unit 20 with the trailing edge of the respective airfoil element 26. If the angle for the vane edge is unacceptable, the electrical control section 144 causes the cylinder 40 to serve in a bending capacity to rotate the head unit 20 for adjusting the angle of the vane edge. The reciprocating cylinder 138 is intermittently operated so that the gauging and bending function occurs periodically along the entire length of the vane. In this manner, it is possible to correct the angle of alignment for both the trailing and leading edges of each airfoil element in order to assure its proper classification.

The guaging and bending machine is also designed to accomplish a number of additional functions in order to facilitate the rapid handling of a relatively large number of elements such as in the assembly 18. For example, a number of circuits are included in the electrical control section for more rapidly processing each vane. In addition, the machine is designed to index and rotate the assembly 18 for automatically aligning a new airfoil element with the head units 20 and 20' so that the alignment for each of the airfoil elements within the assembly 18 may be rapidly established.

The following detailed description as to operation of the gauging and bending machine 10 is set forth in sequences corresponding with the various circuits described above for electrical control section. Accordingly, the circuit titles are employed as headings for sequential portions of the following description.

Tolerance Circuit — With the assembly 18 in place upon the stand 16 and one of its airfoil elements 26 in proper alignment with the head units 20 and 20' the closing valve 150 and 150' are operated to engage the jaws of each head unit 20 and 20' respectively with the trailing edge and the leading edge of the airfoil element. The amplifier unit for each head unit supplies a regulated air flow to the monitoring means, for example that indicated at 36 for the head unit 20. If the head unit is at the same angle as the vane edge, a nominal pressure is generated within the amplifier unit 38. However, if the vane edge is out of angular alignment in either direction from the angle of the closed jaws, either a higher or lower air pressure signal is generated. In such a case, the monitoring means produces a magnified signal causing its pilot valve 48 to deliver an appropriate fluid pressure through the gauging valve to either the head or rod end of the cylinder 40 until the head unit 20 is in alignment with the vane edge.

In this initial step of operation, the jaws for each of the head units 20 and 20' are brought into angular alignment with the respective vane edges. Once this is accomplished, the angle for the vane edge may be compared with the predetermined standard set by the cam assembly. If the angle for the vane edge is within an aceptable range from that preselected value, the reciprocating piston 138 causes the head units 20 and 20' to shift along the length of the entire vane. However, if the angle of the vane edge varies from that preselected value by more than an acceptable margin, the electrical control section is caused to operate in its bending mode as described immediately below.

Bend Circuit — If the angle of the vane edge is found to be out of acceptable limits from the preselected value, the electrical control section causes the bend valve to communicate a signal pressure to either the rod or head end of the cylinder 40. Initially, the bend valve is actuated so that the cylinder rotates the head unit to adjust the angle of the vane edge by approximately 1°. The electrical control circuit then automatically re-establishes the tolerance circuit, the head unit 20 again serving to guage the adjusted angle of the vane edge. If the vane edge is within acceptable angular limits, the head unit is moved to a new position along the length of the vane by the reciprocating cylinder 138. However, if the vane edge angle is still out of tolerance, the bend valve 148 causes the cylinder 40 to rotate the head unit 20 and bend the vane edge one degree further than during the first bending action. This sequential operation is repeated until the vane edge is within acceptable angular limits. Accordingly, during normal operation, both of the head units 20 and 20' will travel along the entire length of the vane to assure its accurate alignment.

As will be seen below, when the angle of the trialing vane edge is being adjusted by the head unit 20, the leading edge of the vane is firmly gripped by the other head unit 20'. Similarly, when the leading edge of the vane is being bent by the head unit 20', the trailing edge of the vane is firmly gripped by the head unit 20.

Over-bend Circuit — During the first bending operation as described above, the appropriate head unit bends the vane edge by a preset amount as discussed briefly above, then pauses for a short interval of time, approximately ¼ second before returning to its gauging mode of operation. During the pause, the over-bend circuit serves to establish a reference in case it is necessary to bend the vane further. Accordingly, if the vane is not in proper alignment after the first bending step, the head unit is caused to bend the vane edge by an additional one degree. When both vane edges are finally brought within tolerance, that point along the length of the vane is accepted. The over-bend circuit then re-establishes the tolerance circuit and the reciprocating cylinder 138 moves the head units 20 and 20' to a new position along the length of the vane.

Zone Circuit — Often the end portions for each vane do not need to be bent as far as the inner or central portions of the vane. For this reason, the zone circuit conditions the bending valve 148 and 148' as well as other associated elements to bend the vane edge relatively less at its ends and relatively more towards the centers. For example, the entire length of each vane edge may be divided into a first central zone as well as second intermediate zones and third zones near the respective ends of the vanes. Within the first central zone, a relatively large amount of bending motion is provided by the control circuit. In the second intermediate zones, possibly ¾ as much bending is provided while in the third zones, approximately half as much bending motion is applied as in the first central zone.

Reciprocating Circuit — The function of this circuit is merely to operate the reciprocating cylinder 138 through the valve 152 for moving the head units 20 and 20' along the length of the respective vane 26 in accordance with the operating steps described above and below.

In commencing the gauging and bending operation for any given vane element 26, the carriage is caused to initially travel to the left as viewed in FIG. 1 until the head units 20 and 20' are in alignment with the left end of the respective vane element. Thereafter, the carriage 22 travels rightwardly along the entire length of the element 26 by the head units 20 and 20'. When the carriage 22 is initially shifted fully to the left, there is a slight delay which allows the tolerance circuit to be actuated before the gauging and bending sequence of operation is commenced.

First Stroke Lockout Circuit — Quite often, it is possible to bring the entire vane within acceptable tolerance by bending only the inner and outer ends of each vane edge. Accordingly, the first stroke lockout circuit allows the tolerance circuit and bend circuit to gauge and make any necessary adjustment at the left end of each of the vanes 26. Immediately thereafter, both of the head units 20 and 20' are caused to shift entirely to the right end of the vane whereupon the tolerance circuit and bend circuit are again actuated for gauging and making any necessary adjustments at the right end of the respective vanes. The first stroke lockout circuit operates in conjunction with the vane acceptance circuit described immediately below to ideally permit immediate acceptance of the vane, if possible.

Vane Acceptance Circuit — As soon as gauging and bending has been accomplished at both ends of the respective airfoil element as described above under the first stroke lockout circuit, the vane acceptance circuit causes gauging to occur along the full length of the vane from its right end to its left end under control of the tolerance circuit. If the entire length of the vane is within acceptable tolerances, the vane is accepted and the gauging and bending machine immediately proceeds with the next sequential element in the assembly 18. If any portion of the vane is out of alignment, the tolerance circuit and the bend circuit functions as described above automatically take place to make any necessary adjustment along the length of the vane.

Stroke Limit Circuit — Occasionally, it is not possible for the head units 20 and 20' to straighten or align the edges of a vane 26 within acceptable limits. Accordingly, after the head units 20 and 20' have been caused to traverse along the vane a number of times, this circuit causes the machine to proceed with the gauging and necessary bending of the next sequential vane. For example, it has been determined that if one vane may not be straightened after the heads 20 and 20' have passed along its length approximately four or five times, then the vane is considered unacceptable and the machine goes on to gauging and bending of the next vane. This circuit may of course include a warning signal (not shown) or other means for indicating the unacceptable form of the particular vane.

Automatic Cycling Circuit — This circuit determines the sequence in which the other circuits operate under normal conditions. This sequence is set forth above and takes place under normal conditions unless the manual cycling circuit described immediately below is actuated.

Manual Cycling Circuit — This circuit allows the gauging and reciprocating functions to be performed without automatic operation of the bend circuit. This circuit allows an operator to inspect a vane. The manual cycling circuit normally functions for a single stroke of the head units 20 and 20' along the length of the respective vane.

Leading Edge Priority Circuit — Since the leading edge of the vane 26 is normally thicker, it is preferable to bend this edge first. Accordingly, a short delay is provided for operation of those components associated with head unit 20. In this manner, the head unit 20' operates in its bending function with the head unit 20 serving to secure the trailing edge against movement. Subsequently, when the leading edge of the vane is within acceptable tolerances, the head unit 20' secures the leading edge of the vane against movement while any necessary angular adjustment for the trailing edge of the vane is made by the other head unit 20.

Gauging Safety Circuit — The gauging safety circuit can be actuated during all gauging and bending operations of the machine 10. If the amount of required bending for tolerance acceptance becomes excessive, the gauging safety circuit terminates operation of the gauging and bending machine until an operator manually conditions the machine for continued operation. Here again, the gauging safety circuit may include a warning lamp (not shown) or other means to signal the operator of such a condition.

GAUGE POINT CIRCUIT— The gauge point circuit is controlled by the cam assembly which may be programmed to establish selected points along the length of each vane where the head units 20 and 20' will stop for sequential gauging and bending operation. Accordingly, any number of such gauging points may be provided on the cam assembly depending upon the accuracy of alignment required for the instant vane. A control switch can eliminate this circuit if desired.

Indexing Circuit — When a single vane within the assembly has been found to be within angular limits, additional motor means (not shown) function to rotate the assembly 18 for aligning a new vane 26 with the head units 20 and 20'. Normally, the automatic cycling circuit described above then functions to initiate gauging and bending of the new vane in the same manner described above. The indexing circuit may also include means for terminating operation after a select number of vanes have been gauged and aligned. For example, such a number would normally correspond with the number of vanes within one of the assemblies 18.

Accordingly, it may be seen that the present gauging and bending machine may be employed to gauge and align a single element such as one of the vanes 26 or a plurality of such elements arranged fo example within an assembly such as that indicated at 18. The gauging and bending machine may be adapted to a variety of different elements. For example, if the assembly 18 is replaced by another assembly having vanes of different alignment and shape, the jaws 32, 34 for each of the head units may be replaced by jaws conforming to the shape of the new vane. At the same time, the cam assembly 102 is also replaced by a cam assembly having a cam track configuration corresponding to a preselected standard for the new vane.

It will be obvious that numerous modifications and variations are possible for the above described gauging and bending machine within the scope of the present invention. The foregoing description, as setting forth various constructional and operation details for purposes of and understanding of the invention only, is not to be taken as limiting the scope of the present invention which is defined only by the following claims.

I claim:

1. A vane gauging and bending apparatus for aligning vanes supported in a vane assembly by suitable flange means, comprising
   support means for securing the flange means of the vane assembly in a preselected alignment,
   monitor means for engaging a selected surface of one vane while its flange means is secured by the support means, the monitor means producing a signal representative of the angular alignment for the one vane,
   movable jaw means adapted for gripping the one vane, motor means coupled with the jaw means and being operable to selectively move the jaw means for changing angular alignment of the one vane, and means coupled with the monitor means and motor means for receiving the signal generated by the monitor means and producing an output signal proportional thereto for operating the motor means and thereby causing motion of the jaw means for achieving a preselected angular alignment of the one vane.

2. The gauging and bending apparatus of claim 1 wherein the signal receiving means comrprises a multiplier valve for receiving the variable fluid signal from the monitor means and producing a magnified output fluid signal proportional thereto, the signal receiving means also comprising pilot means for receiving the magnified signal and delivering acutating fluid to the motor means for operating the motor means in proportion to the output signal from the multiplier valve.

3. The vane gauging and bending apparatus of claim 1 wherein the signal produced by the monitor means is a pneumatic signal, the vane gauging and bending apparatus further comprising a source of air pressure in communication with the monitor means through a conduit, the monitor means also including a movable sensing member resiliently urged into engagement with the surface of the vane, the movable sensing member being arranged to form a gap for allowing air to escape from the conduit, the position of the movable sensing means thus causing the signal produced by the monitor means to vary in accordance with angular alignment of the vane.

4. A gauging and aligning apparatus for determining initial alignment of an element and adjusting the element to have a predetermined angular alignment relative to a base means secured to the element comprising:

support means for securing the element base in a selected angular alignment, monitor means including sensing means for contacting and determining initial alignment of the element and signal means for producing a signal proportional to the difference between the initial alignment of the element and its predetermined angular alignment, movable jaw means for gripping the element and adjusting its angular alignment relative to its base means, motor means coupled with the movable jaw means for shifting the jaw means and thereby adjusting angular alignment of the element, and means being coupled with the monitor means for receiving the signal from the signal means and producing an output signal proportional thereto for operating the motor means.

5. The vane gauging and bending apparatus of claim 4 wherein the signal produced by the monitor means is a pneumatic signal, the vane gauging and bending apparatus comprising a sorce of air pressure in communication with the monitor means through a conduit, the monitor means also including a movable sensing member resiliently urged into engagement with a surface of the element which is representative of its angular alignment, the movable sensing member being arranged to form a gap for allowing air to escape from the conduit, the position of the movable sensing means thus causing the signal produced by the monitor means to vary in accordance with angular alignment of the element.

6. A vane gauging and bending machine for adjusting alignment of individual vanes within a cylindrical vane cluster comprising a plurality of vanes arranged in radially spaced-apart relation and supported in fixed angular alignment by suitable flange means, comprising:

support means for engaging the flange means and securing the vane cluster assembly thereupon, monitor means for engaging a selected surface of one vane and producing a signal of variable fluid pressure representative of the angular alignment for the one vane, movable jaw means adapted for gripping the one vane, motor means coupled with the jaw means and being operable to selectively move the jaw means for changing angular alignment of the one vane, and means coupled with the monitor means and motor means for receiving the fluid pressure signal generated by the monitor means and producing an output signal proportional thereto for operating the motor means and thereby causing motion of the jaw means for achieving a preselected angular alignment of the one vane.

7. The gauging and bending apparatus of claim 6 wherein the signal receiving means comprises a multiplier valve for receiving the variable fluid signal from the monitor means and producing a magnified output fluid signal proportional thereto, the signal receiving means also comprising pilot means for receiving the magnified signal and delivering actuating fluid to the motor means for operating the motor means in proportion to the output signal from the multiplier valve in order to cause motion of the jaw means for achieving a preselected angular alignment of the one vane.

8. In a method for simultaneously gauging and bending an element secured to a supporting flange means, the steps comprising:

gripping a bendable edge portion of the element with jaw means including monitor means for sensing angular alignment of the element, sensing instant angular alignment of the edge portion of the element through the monitor means and producing an output signal representative of the sensed angular alignment, and operating motor means in response to the signal from the monitor means for shifting the jaw means in a direction for adjusting angular alignment of the element toward a preselected value.

9. The method of claim 8 wherein the element includes a plurality of bendable edge portions and comprising the additional steps of providing similar jaw means for respectively gripping the plurality of bendable edges, first operating one of the jaws with relatively increased clamping pressure to secure the respective edge portion of the element while the other jaw is operated to gauge and bend its respective edge portion of the element and subsequently operating the other jaw with increased clamping pressure to secure its respective edge portion of the element against movement while operating the one jaw to gauge and bend its respective edge portion of the element.

10. The method of claim 8 wherein a plurality of elements are secured to the supporting flange means and comprising the additional steps of providing means for determining when angular alignment of the bendable edge for the element is within satisfactory limits and operating means in response thereto for shifting the supporting flange means in order to place an additional element in alignment with the jaw means.

11. In a method of simultaneously gauging and bending an elongated portion of an airfoil element secured to suitable supporting flange means, the steps comprising:

securing the flange means in a fixed angular position, engaging an elongated bendable edge portion of the airfoil element with jaw means including monitor means capable of producing a signal representative of angular alignment for the elongated edge portion of the airfoil element, comparing the signal generated by the monitor means with a signal representative of a preselected angular alignment, and operating motor means in response to a minimum difference between sad signals for shifting the jaw means in order to adjust the angular alignment of the elongated edge for the airfoil means.

12. The method of claim 11 comprising the additional step of amplifying the signal received from the monitor means and operating the motor means by said amplified signal.

13. The method of claim 11 comprising the additional steps of sequentially repeating the monitoring and bending steps and incrementally increasing adjustment of the jaw means in order to incrementally bend the elongated edge of the airfoil element toward an angular alignment corresponding with a preselected value.

14. The method of claim 13 comprising the additional steps of shifting the jaw means along the elongated edge of the airfoil element and incrementally repeating the monitoring and bending steps at preselected locations along the airfoil element length, the motor means being operable to adjust the position of the jaw means only when the elongated edge portion of the airfoil element is outside of acceptable angular limits at any one of the locations along the length thereof.

15. The method of claim 11 wherein a plurality of airfoil elements are commonly secured by the suppoting flange means and further comprising the additional steps of sensing when the elongated edge of the one airfoil element is within acceptable angular limits and operating means in response thereto for repositioning the supporting and aligning a second airfoil element with the jaw means in order to repeat the monitoring and bending steps for the second airfoil element.

16. The method of claim 11 wherein the airfoil element is formed wth a leading edge and trailing edge generally arranged in opposition to each other and comprising the additional steps of similarly gripping both of the leading and trailing edges by first and second jaw means each including similar monitor means, initially operating the motor means to cause one of the jaw means to apply inreased gripping pressure to its edge portion while the monitoring and bending steps are accomplished with the other jaw means, thereafter operating the motor means to cause the other jaw means to grip its respective edge portion with increased pressure while the monitoring and bending steps are carried out in connection with the one jaw means.

17. The method of claim 11 comprising the additional step of shifting the jaw means along the airfoil element edge and performing the monitoring and bending steps at selected locations therealong and initially positioning the jaw means for gauging and bending opposite end portions of the airfoil element edge, the jaw means thereafter being shifted along the length of the airfoil element edge to gauge intermediate locations of the airfoil element edge with bending of the intermediate portions of the airfoil element edge being accomplished as necessary.

18. The method of claim 11 comprising the additioanl steps of shifting the jaw means along the airfoil element edge with gauging and bending being accomplished at selected locations therealong and operating the motor means for relatively increased adjustment of the jaw means at intermediate locations along the length of the airfoil element edge as compared to adjustment at the end portions of the airfoil element edge.

* * * * *